United States Patent
Terao et al.

(10) Patent No.: US 12,537,364 B2
(45) Date of Patent: Jan. 27, 2026

(54) METHOD OF MANUFACTURING VERTICAL CAVITY SURFACE EMITTING LASER ELEMENT AND VERTICAL CAVITY SURFACE EMITTING LASER ELEMENT

(71) Applicant: NICHIA CORPORATION, Anan (JP)

(72) Inventors: Kenichi Terao, Tokushima (JP); Daisuke Morita, Tokushima (JP)

(73) Assignee: NICHIA CORPORATION, Anan (JP)

( * ) Notice: Subject to any disclaimer, the term of this patent is extended or adjusted under 35 U.S.C. 154(b) by 560 days.

(21) Appl. No.: 18/148,328

(22) Filed: Dec. 29, 2022

(65) Prior Publication Data

US 2023/0144914 A1 May 11, 2023

Related U.S. Application Data (63) Continuation of application No. PCT/JP2021/018220, filed on May 13, 2021.

(30) Foreign Application Priority Data

Jun. 30, 2020 (JP) ................... 2020-112714

(51) Int. Cl.
*H01S 5/183* (2006.01)
*H01S 5/02* (2006.01)

(52) U.S. Cl.
CPC ........ *H01S 5/18377* (2013.01); *H01S 5/0212* (2013.01); *H01S 5/18369* (2013.01)

(58) Field of Classification Search
CPC ............... H01S 5/18377; H01S 5/0212; H01S 5/18369; H01S 5/18361; H01S 2304/04; H01S 5/34333
See application file for complete search history.

(56) References Cited

U.S. PATENT DOCUMENTS

| | | | |
|---|---|---|---|
| 2008/0056320 A1* | 3/2008 | Takeuchi | B82Y 20/00 372/45.01 |
| 2015/0235837 A1 | 8/2015 | Chang et al. | |

(Continued)

FOREIGN PATENT DOCUMENTS

| | | |
|---|---|---|
| JP | 2003-086837 A | 3/2003 |
| JP | 2004-235473 A | 8/2004 |

(Continued)

OTHER PUBLICATIONS

International Search Report in PCT/JP2021/018220, dated Jul. 20, 2021.

*Primary Examiner* — Yuanda Zhang
(74) *Attorney, Agent, or Firm* — Global IP Counselors, LLP (57) ABSTRACT

A method of manufacturing a vertical cavity surface emitting laser element including a first reflector including a nitride semiconductor multilayer film, the method includes: growing a first semiconductor layer consisting of a group III semiconductor containing aluminum and indium, the growing of the first semiconductor layer consisting of growing a first layer by supplying an aluminum source gas, an indium source gas, and a nitrogen source gas, and growing a second layer by supplying an aluminum source gas, an indium source gas, and a nitrogen source gas so that an indium composition ratio of the second layer is higher than an indium composition ratio of the first layer; and growing a second semiconductor layer consisting of gallium nitride. The growing of the first semiconductor layer and the growing of the second semiconductor are repeated alternately to form the nitride semiconductor multilayer film constituting the first reflector.

20 Claims, 6 Drawing Sheets

(56) References Cited

U.S. PATENT DOCUMENTS

2016/0056333 A1    2/2016  Takeuchi et al.
2018/0166855 A1    6/2018  Takeuchi et al.

FOREIGN PATENT DOCUMENTS

| | | |
|---|---|---|
| JP | 2007-258406 A | 10/2007 |
| JP | 2018-098347 A | 6/2018 |
| JP | 2020-077649 A | 5/2020 |
| WO | 2014/167965 A1 | 10/2014 |

\* cited by examiner

METHOD OF MANUFACTURING VERTICAL CAVITY SURFACE EMITTING LASER ELEMENT AND VERTICAL CAVITY SURFACE EMITTING LASER ELEMENT

CROSS-REFERENCE TO RELATED APPLICATIONS

This is a continuation application of International Application No. PCT/JP2021/018220 filed on May 13, 2021, which claims priority to Japanese Patent Application No. 2020-112714, filed on Jun. 30, 2020. The entire disclosures of International Application No. PCT/JP2021/018220 and Japanese Patent Application No. 2020-112714 are hereby incorporated herein by reference.

TECHNICAL FIELD

The present disclosure relates to a method of manufacturing a vertical cavity surface emitting laser element and a vertical cavity surface emitting laser element.

TECHNICAL BACKGROUND

A vertical cavity surface emitting laser element for extracting laser light from a direction perpendicular to the substrate surface has reflectors in the vertical direction of the active layer in order to constitute an optical resonator. Among such reflectors, a reflector made of a semiconductor multilayer film is formed of a structure in which first semiconductor layers and second semiconductor layers having band gap energies larger than the energy corresponding to the oscillation wavelength of the laser light are alternately stacked.

International Publication No. WO2014/167965 discloses a nitride semiconductor multilayer film reflector using, respectively as the first semiconductor layers and the second semiconductor layers, AlGaN and GaN, or AlInN and GaN.

SUMMARY

However, dislocations attributed to composition may occur, in particular, in AlInN of the first semiconductor layers.

Accordingly, there is a demand for a method of manufacturing a vertical cavity surface emitting laser element in which the occurrence of dislocations in the semiconductor layers of a semiconductor multilayer film that constitutes a reflector can be reduced.

A method of manufacturing a vertical cavity surface emitting laser element according to an embodiment of the present disclosure is a method of manufacturing a vertical cavity surface emitting laser element including a first reflector including a nitride semiconductor multilayer film. The method includes: growing a first semiconductor layer consisting of a group III semiconductor containing aluminum and indium, the growing of the first semiconductor layer consisting of growing a first layer by supplying an aluminum source gas, an indium source gas, and a nitrogen source gas, and growing a second layer by supplying an aluminum source gas, an indium source gas, and a nitrogen source gas so that an indium composition ratio of the second layer is higher than an indium composition ratio of the first layer; and growing a second semiconductor layer consisting of gallium nitride. The growing of the first semiconductor layer and the growing of the second semiconductor are repeated alternately to form the nitride semiconductor multilayer film constituting the first reflector.

A vertical cavity surface emitting laser element according to another embodiment of the present disclosure includes a first reflector. The first reflector includes a nitride semiconductor multilayer film including a plurality of first semiconductor layers each consisting of a group III nitride semiconductor containing aluminum and indium, and a plurality of second semiconductor layers each consisting of gallium nitride, the first semiconductor layers and the second semiconductor layers being alternately stacked. A refractive index of the first semiconductor layers is different from a refractive index of the second semiconductor layers. Each of the first semiconductor layers consists of a first layer and a second layer, an indium composition ratio of the first layer being higher than an indium composition ratio of the second layer.

A method of manufacturing a vertical cavity surface emitting laser element in which the occurrence of dislocations can be reduced in the semiconductor layers of a semiconductor multilayer film that constitutes a reflector, and a vertical cavity surface emitting laser element with a reduced number of dislocations in the semiconductor layers that constitute a reflector.

EMBODIMENTS

Certain embodiments of the present invention will be described below with reference to the accompanying drawings. The embodiments to be described below are provided for the purpose of giving a concrete form to the technical ideas of the present invention, the present invention is not limited to the description below unless otherwise specifically noted.

The content described with reference to one embodiment or experimental example is applicable to another embodiment or experimental example. The sizes and thicknesses of and positional relationships between the members shown in the drawings might be exaggerated for clarity of explanation. Members made of the same materials or have the same function might be denoted with the same reference numerals. When a numerical range is provided, the values at both ends of the dash or the word "to" are included in the range.

Method of Manufacturing Vertical Cavity Surface Emitting Laser Element

Figure 1A:
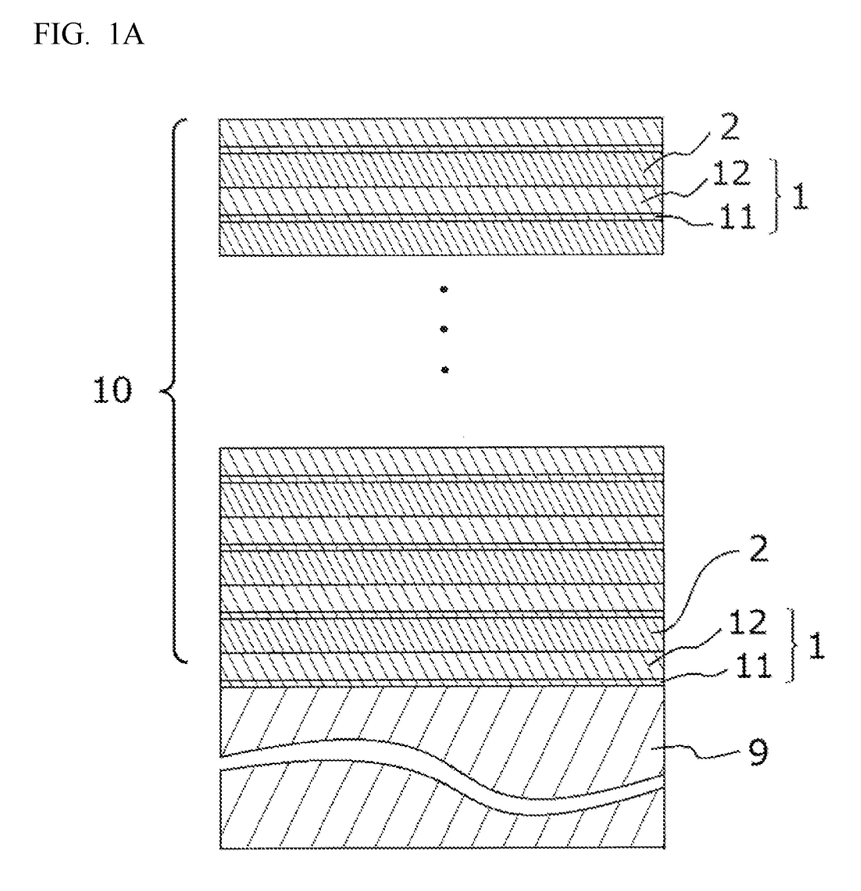
FIG. 1A is a schematic cross-sectional view explaining the structure of a first reflector in a vertical cavity surface emitting laser element according to an embodiment of the present invention.

A vertical cavity surface emitting laser element formed by a method of manufacturing a vertical cavity surface emitting laser element according to one embodiment of the present disclosure includes a first reflector 10 which includes a nitride semiconductor multilayer film such as that shown in FIG. 1A. The first reflector 10 is formed of a structure in which first semiconductor layers 1 consisting of a group III nitride semiconductor containing aluminum and indium and second semiconductor layers 2 consisting of gallium nitride are alternately stacked. In the first reflector 10, the refractive index of the first semiconductor layers 1 differs from the refractive index of the second semiconductor layers 2. Each first semiconductor layer 1 consists of a first layer 11 and a second layer 12 in which the indium composition ratio of the first layer 11 is lower than the indium composition ratio of the second layer 12.

In the vertical cavity surface emitting laser element having the first reflector 10 having such a structure, occurrence of dislocations in the semiconductor layers that make up the first reflector 10 can be reduced. This allows for reducing optical loss attributable to scattering by the first reflector 10 or the like, which allows for providing a higher external quantum efficiency vertical cavity surface emitting laser element.

Figure 3:
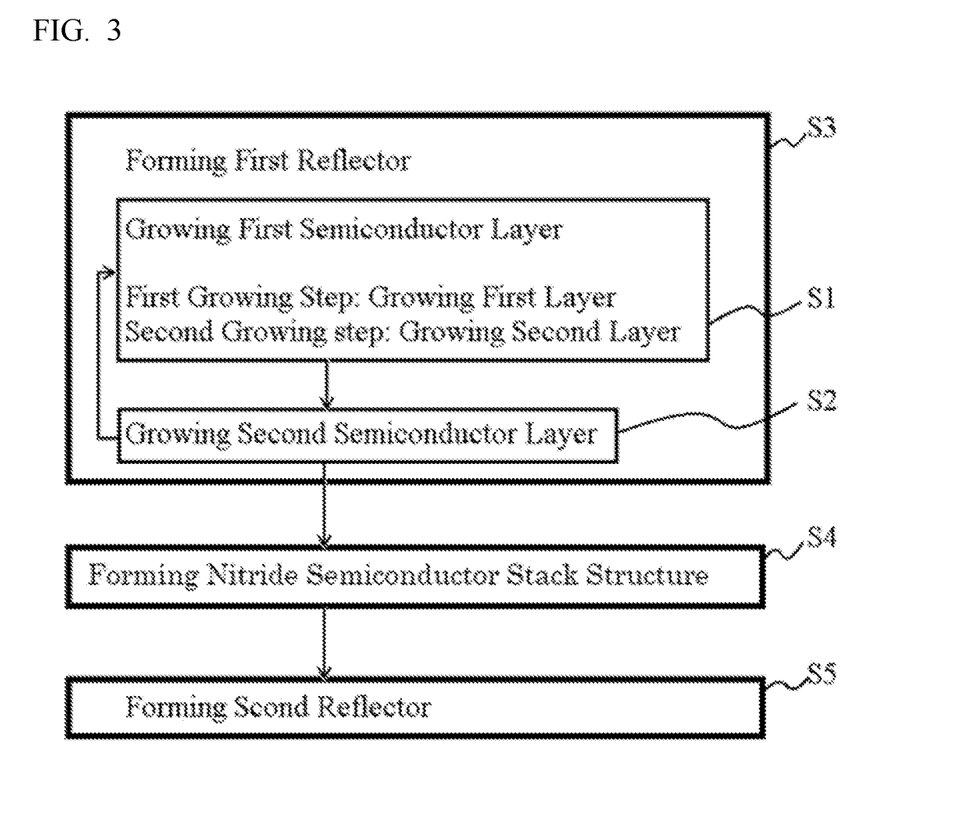
FIG. 3 is a flowchart of a method of manufacturing a vertical cavity surface emitting laser element according to an embodiment of the present invention.

In a method of manufacturing a vertical cavity surface emitting laser element according to an embodiment of the present disclosure, forming the first reflector 10 (S3 in FIG. 3) includes growing a first semiconductor layer 1 consisting of a group III nitride semiconductor containing aluminum and indium (S1 in FIG. 3), and growing a second semiconductor layer 2 consisting of gallium nitride (S2 in FIG. 3). Growing the first semiconductor layer 1 includes a first growing step and a second growing step. In the first growing step, an aluminum source gas, an indium source gas, and a nitrogen source gas are supplied to grow the first layer 11, and in the second growing step, the second layer 12 having an aluminum source gas, an indium source gas, and a nitrogen source gas are supplied to grow the second layer 12 having a higher indium composition ratio than that of the first layer 11. The step of growing the first semiconductor layer 1 and the step of growing the second semiconductor layer 2 are alternately repeated (S1→S2→S1→S2 . . . in FIG. 3).

In forming a first reflector 10, for example, the step of growing the first semiconductor layer 1 is performed, and then on the first semiconductor layer 1 the second semiconductor layer 2 can be grown. In the step of growing the first semiconductor layer 1, the first semiconductor layer 1 can be initially grown on a substrate 16 or a base layer 9 on which the first reflector 10 is to be formed, and in the subsequent alternately-repeated steps, the first semiconductor layer 1 can be grown on the second semiconductor layer 2. For each first semiconductor layer 1, the first layer 11 can be initially grown by the first growing step, followed by growing the second layer 12 by the second growing step.

The crystalline quality of a semiconductor layer whose composition includes aluminum and indium such as AlInN tends to degrade as the indium composition ratio increases, allowing dislocations to occur in the semiconductor layer. In view of this, with the first semiconductor layer 1 including a semiconductor layer consisting of aluminum and indium and also including a semiconductor layer having a lower indium composition ratio than that, the occurrence of dislocations in the first reflector 10 can be effectively reduced.

Any appropriate numbers of alternate repetitions of the step of growing the first semiconductor layer 1 and the step of growing the second semiconductor layer 2 can be performed in accordance with the materials used, the target performance, and the like. For example, the steps can be alternately repeated 5 to 100 times, preferably 20 to 80 times, more preferably 30 to 70 times. In other words, the number of pairs of the first semiconductor layer 1 and the second semiconductor layer 2 is preferably set as 5 to 100 pairs, more preferably 20 to 80 pairs, even more preferably 30 to 70 pairs. Setting the number of pairs to be in the ranges described above can increase the reflectivity while maintaining the dislocation controllability. Thus, a nitride semiconductor multilayer film is formed to form the first reflector 10 (S3 in FIG. 3). In particular, growing as the first semiconductor layer 1 the first layer 11 and the second layer 12 having a higher indium composition ratio than that of the first layer 11 allows for effectively reducing dislocations in the nitride semiconductor multilayer film in the first reflector 10. In other words, the occurrence of dislocations initiated in the first semiconductor layers 1 can be effectively reduced. This allows for reducing optical loss attributable to scattering by the first reflector 10 or the like, making it possible to manufacture a higher external quantum efficiency vertical cavity surface emitting laser element.

The method of manufacturing the vertical cavity surface emitting laser element preferably further comprises forming on the upper surface of the first reflector 10 a nitride semiconductor stack structure 3 having an active layer 3a (S4 in FIG. 3) and forming a second reflector 6 above the nitride semiconductor stack structure 3 (S5 in FIG. 3). When the active layer 3a is stacked above a reflector, the crystalline condition of the reflector such as dislocations is transferred to the active layer 3a. As described above, the occurrence of dislocations in the first reflector 10 can be reduced, so that semiconductor layers with reduction in dislocations can be stacked above the reflector. Thus, the radiative recombination can occur more efficiently in the active layer 3a, making it possible to reduce the threshold current for the vertical cavity surface emitting laser element.

Growing First Semiconductor Layer 1

Figure 1B:
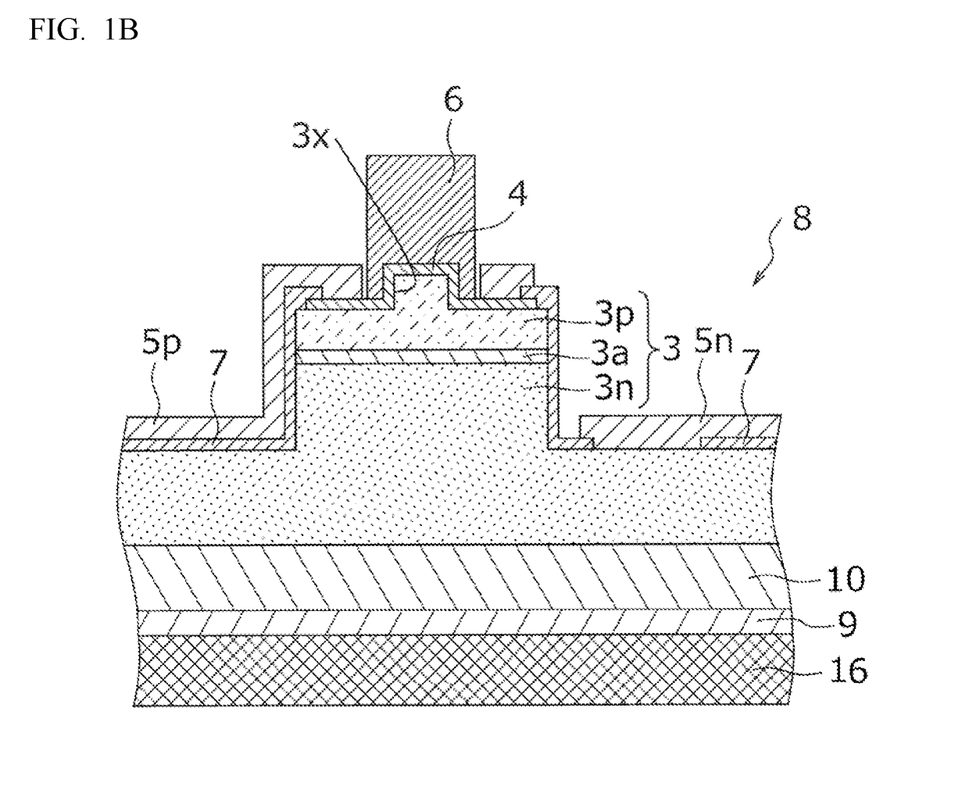
FIG. 1B is a schematic cross-sectional view explaining the stacked structure of a vertical cavity surface emitting laser element according to an embodiment of the present invention.

The step of growing the first semiconductor layer 1 (S1 in FIG. 3) includes a first growing step and a second growing step. The first growing step and the second growing step are preferably performed in this order. In other words, as shown in FIG. 1A or 1B, as the lowermost first semiconductor layer 1 in the first reflector 10, the first layer 11 is preferably grown on the substrate 16 or the base layer 9, and the second layer 12 on the first layer 11. In each of the upper first semiconductor layers, the first layer 11 is preferably grown on the second semiconductor layer 2 grown on the first semiconductor layer 1 thereunder, and the second layer 12 on the first layer 11. The crystalline quality degradation which is a concern in the case of involving a high indium composition ratio is believed to be largely affected by the defects that occur in the initial stages of semiconductor layer growth. Furthermore, composing the first semiconductor layer 1 only with a high aluminum composition first layer 11 might allow for crack formation or expansion. In contrast, growing the layers in the order described above allows for effectively reducing the occurrence of dislocations while reducing formation or expansion of a crack.

For the substrate 16 or the base layer 9, any material known in the art that can be used to construct a vertical cavity surface emitting laser element can be used. For example, a substrate for growing a semiconductor layer or a base layer formed on the substrate, specifically, a substrate made of a nitride semiconductor (GaN or the like), sapphire, SiC, Si, or the like, can be used. Among these, a nitride semiconductor substrate is preferable, a GaN substrate is more preferable. Using a GaN substrate as the semiconductor layer growth substate allows for obtaining a semiconductor reflector in which dislocations are reduced. The base layer 9 can be selected by considering lattice matching between the substrate 16 and the first reflector 10. For example, a GaN layer is preferable. Examples of the substrate 16 or the base layer 9 include a structure having a predetermined crystal plane, such as the C-plane, the A-plane, or the like as a surface on which the first semiconductor layers 1 are to be grown. The substrate 16 or the base layer 9 may have an off-angle of 0 to about 10 degrees with respect to the predetermined crystal plane. For example, the C-plane of GaN may be the +C-plane (group III element-polar plane) or the −C-plane (nitrogen-polar plane). In particular, a structure that has the +C-plane of GaN as a surface on which the first semiconductor layers 1 are to be grown is preferably used for the substrate 16 or the base layer 9. Employing the +C-plane of GaN facilitates crystal growth. The thickness of the base layer 9 can be set to any thickness, for example, 100 nm to 3000 nm. The base layer 9 can be doped with an n-type impurity, but is preferably undoped from the standpoint of crystalline quality. For example, in the case of using silicon as the n-type impurity, the n-type impurity concentration can be set to 0.5 to $10 \times 10^{18}$ $cm^{-3}$.

The first semiconductor layers 1, i.e., both the first layers 11 and the second layers 12, are consisting of a group III nitride semiconductor containing aluminum and indium. Examples of such semiconductors include $Al_xIn_yGa_{1-X-Y}N$ (0≤X, 0≤Y, X+Y≤1), specifically AlInGaN, AlInN, or the like. Among these, AlInN layers are preferable. Particularly, the indium composition ratio of the second layers 12 is preferably higher than the indium composition ratio of the first layers 11 by 0.01 to 0.1. With such an indium composition ratios, occurrence of dislocations can be effectively reduced. The first semiconductor layers 1 may be a single crystal.

The first semiconductor layers 1 can be grown by using any technique known in the art, for example, MOCVD (metalorganic chemical vapor deposition), HVPE (hydride vaper phase epitaxy), MBE (molecular beam epitaxy) or the like. Among these, MOCVD is preferable from the standpoints of ease of thickness control and growth time. Regardless of the method used, the first semiconductor layers 1 may be grown under ordinary or reduced pressure.

For example, the substrate 16 having a base layer 9 formed thereon is placed in the reaction chamber of a MOCVD device. Subsequently, the substrate temperature is increased, for example, to 700° C. to 950° C., in a specific example, 900° C., and carrier and source gases are allowed to flow into the reaction chamber. Accordingly, the first semiconductor layer 1 consisting of a group III nitride semiconductor containing, for example, aluminum and indium can be formed. Examples of carrier gases include hydrogen gas, nitrogen gas, and argon gas. With respect to source gases, for example, gallium source gases include trialkylgallium, such as TMG (trimethylgallium), TEG (triethylgallium), and the like. Examples of nitrogen source gases include ammonia, nitrogen, and the like. Examples of aluminum source gases include trialkylaluminum such as TMA (trimethylaluminum), and aluminum chloride. Indium source gases include trialkylindium such as TMI (trimethylindium), and the like.

The first semiconductor layer 1 can have any appropriate thickness, for example, in a range of 30 nm to 80 nm. The first semiconductor layers 1 can be doped with an n-type impurity, but are preferably undoped from the standpoints of crystalline quality and reflectivity. For example, in the case of using silicon as the n-type impurity, the n-type impurity concentration can be set to 0.5 to $10 \times 10^{18}$ $cm^{-3}$.

First Growing Step: First Layer 11

As described above, the first growing step is performed to grow the first layer 11. In other words, in the first growing step, the first layer 11 is grown by supplying aluminum, indium, and nitrogen source gases. In the case of growing AlInGaN, a gallium source gas can be introduced.

For example, the first growing step is performed by supplying aluminum and indium source gases at a predetermined temperature. The growth temperature for the first layer 11 in this case can be set to 700° C. to 950° C.

In this manner, the first layer 11 can be grown, for example, to a thickness of 8 nm or less. The thickness of the first layer 11 is preferably set to 1 nm to 8 nm, more preferably 1 nm to 3 nm. Setting the thickness of the first layer 11 to 8 nm or less can reduce crack formation while reducing the occurrence of dislocations.

The resulting first layer 11, for example, is an AlInN layer having an indium composition ratio of 0.10 to 0.20, preferably 0.12 to 0.19, more preferably 0.14 to 0.18. Setting the indium composition ratio to fall within these ranges can reduce crack formation while reducing the occurrence of dislocations.

The growth rate in the first growing step may fluctuate during the growth of the first layer 11, but the layer is preferably grown under constant conditions without intentionally changing the growth conditions. In other words, the first layer 11 may have a composition gradient within the layer, but preferably not. Having no composition gradient allows for increasing the reflectivity as a reflector. The first layers 11 may be doped with an n-type impurity, but are preferably undoped from the standpoints of crystalline quality and reflectivity.

Second Growing Step: Second Layer 12

In the second growing step, the second layer 12 having a higher indium composition ratio than that of the first layer 11 is grown by supplying aluminum, indium, and nitrogen source gases.

For example, the growth rate for the second layer 12 in the second growing step may be set higher than the growth rate for the first layer 11 in the first growing step, or the second layer 12 in the second growing step may be grown at a lower temperature than the temperature used in the first growing step. In the case of increasing the growth rate for the second layer 12 in the second growing step, the growth temperature in the second growing step may be different from or the same as that in the first growing step. In the case of employing for the second growing step a lower growth temperature than that in the first growing step, the growth rate in the second growing step may be different from or the same as the growth rate in the first growing step. The growth temperature as used herein refers to the set temperature of a heating means or equipment which maintains the temperature such as a heater, not the temperature of the substrate actually measured. The same growth rate and the same growth temperature here tolerate variation of about ±1%.

Particularly, the growth rate for the second layer 12 in the second growing step is preferably set as 1.5 times or greater and 4 times or less of the growth rate for the first layer 11. Setting the growth rate for the second layer 12 to fall within the above range can effectively reduce the occurrence of dislocations. In this case, the growth temperature for the second layer 12 can be set as 690° C. to 960° C.

The growth temperature in the second growing step, moreover, can be set lower than the growth temperature in the first growing step by 10° C. to 100° C. Specifically, it can be set in a range of 600° C. to 940° C., for example. In this case, the second layer 12 can be grown at a growth rate that falls within the same range as that for the first layer 11.

This allows for growing the second layer 12 to have a predetermined thickness, for example. The thickness of the second layer 12 is preferably set larger than the thickness of the first layer 11. For example, the second layer 12 is preferably in a range of 30 nm to 80 nm, more preferably in a range of 40 nm to 60 nm. Setting the thickness of the second layer 12 to be in these ranges allows for increasing reflectivity with respect to visible light. The second layers 12 may be doped with an n-type impurity, but are preferably undoped. For example, in the case of using silicon as the n-type impurity, the n-type impurity concentration can be set to 0.5 to $10 \times 10^{18}$ cm$^{-3}$.

The growth rate and/or the growth temperature in the second growing step may fluctuate during the growth of a layer, but the layer is preferably grown under constant conditions without intentionally changing the growth conditions. In other words, each second layer 12 may have a composition gradient within the layer, but preferably not.

A resultant second layer 12 can have a higher indium composition ratio than the first layer 11. The indium composition ratio of the first layer 11: the indium composition ratio of the second layer 12=0.10-0.20:0.15-0.25, preferably 0.12-0.19:0.16-0.23, more preferably 0.14-0.18:0.17-0.21. A resultant second layer 12, for example, is an AlInN layer, preferably one having an indium composition ratio of 0.15-0.25, more preferably 0.16-0.23, even more preferably 0.17-0.21. The second layer 12 preferably has a 1 to 10%, more preferably 1 to 8%, even more preferably 1 to 5% higher indium composition ratio than that of the first layer 11. Setting the indium composition ratios of the first layer 11 and the second layer 12 to fall within the above ranges can effectively reduce the occurrence of dislocations.

A higher growth rate and/or a lower growth temperature for the second layer 12 as compared to the first layer 11 of the first semiconductor layer 1 allows for facilitating desorption of indium atoms during the growth. Thus, the indium composition ratio of the first layer 11 can be reduced as compared to the second layer 12 whereby the occurrence of dislocations in the nitride semiconductor multilayer film can be effectively reduced. This, for example, can effectively reduce dislocations while reducing crack formation or expansion which would occur in the case of forming the entire first semiconductor layer 1 with low indium composition. Among these cases, using a higher growth rate for the second layer 12 of the first semiconductor layer 1 as compared to the first layer 11, i.e., using a lower growth rate for the first layer 11 as compared to the second layer 12, can increase the atomic diffusion lengths of the atoms including indium in the first layer 11, which can facilitate growing into a flat layer.

Growing Second Semiconductor Layer 2

The step of growing the second semiconductor layer 2 consisting of gallium nitride (S2 in FIG. 3) may be performed after performing a step of growing the first semiconductor layer 1. In other words, the second semiconductor layer 2 may be grown on the first semiconductor layer 1 (on the second layer 12). The step of growing the second semiconductor layer 2 may be performed before the step of growing the first semiconductor layer 1. In other words, the second semiconductor layer 2 may be grown on the substrate 16 or the base layer 9.

In the case of growing the second semiconductor layer 2, for example, a carrier gas and source gases (TMG and ammonia) are allowed to flow into the reaction chamber. The growth rate for the second semiconductor layer 2 may fluctuate during the growth, but preferably remains constant. In forming the second semiconductor layer 2, the surface on which the second semiconductor layer 2 is to be formed is preferably the C-plane of GaN, particularly the +C-plane.

The step of forming the second semiconductor layer 2 may be performed by using a different method from that for the step of forming the first semiconductor layer 1, but is preferably performed by the same method, for example, MOCVD.

The temperature of the substrate is raised, for example, to 1000° C. to 1100° C., specifically 1050° C., and a carrier gas and source gases are allowed to flow into the reaction chamber. This allows for growing the second semiconductor layer 2 consisting of gallium nitride, GaN, for example. The carrier gases, nitrogen gallium source gasses are similar to those described above.

The thickness of the second semiconductor layer 2 here can be set freely, for example, 30 nm to 80 nm. Accordingly, the total thickness of the nitride semiconductor multilayer film that constitute the first reflector 10 is, for example, 500 nm to 1000 nm, preferably 2000 nm to 8000 nm, more preferably 3000 nm to 7000 nm. Setting the film thickness to be in the above ranges allows for effectively increasing the reflectivity while reducing increase in thickness. The second semiconductor layers 2 can be doped with an n-type impurity, but are preferably undoped. For example, in the case of using silicon as the n-type impurity, the n-type impurity concentration can be set to 0.5 to $10 \times 10^{18}$ cm$^{-3}$. The second semiconductor layers 2 may be a single crystal.

Forming Nitride Semiconductor Stack Structure 3

A nitride semiconductor stack structure 3 is preferably formed on the upper surface of the first reflector 10 (S4 in FIG. 3), for example, as shown in FIG. 1B.

In the nitride semiconductor stack structure 3, it is preferable to form an n-side semiconductor layer 3n, the active layer 3a, and a p-side semiconductor layer 3p from the first reflector 10 side in this order. The nitride semiconductor stack structure 3 can be formed by using any method known in the art.

A protruded part 3x may be formed on a surface of the nitride semiconductor stack structure 3, the surface not facing the first reflector 10. The protruded part 3x can be formed by using photolithography and etching process, or the like.

Forming Second Reflector

When the protruded part 3x is formed on the surface of the nitride semiconductor stack structure 3, the second reflector 6 can be disposed on the upper surface of the protruded part 3x and at least a portion of a surface of the stack structure around the protruded part 3x, for example, as shown in FIG. 1B (S5 in FIG. 3). When no protruded part is formed, an insulation layer which exposes a portion of the nitride semiconductor stack structure 3 can be formed, and the second reflector 6 can be formed to cover the area above the exposed portion of the nitride semiconductor stack structure 3.

The second reflector 6 can have similar constituents to those of the first reflector 10 described above, or have a structure that includes, for example, a dielectric multilayer film. Examples of dielectric multilayer films include $SiO_2/Nb_2O_5$, $SiO_2/Ta_2O_5$, $SiO_2/Al_2O_3$, and the like. The thickness of each layer is $\lambda/4n$ (where $\lambda$, is the laser oscillation wavelength, n is the refractive index of the medium used for the layer). The number of layers and the thickness of the second reflector 6 can be suitably set by a combination of dielectric layers. Specifically, in the case of constructing the second reflector 6 with $SiO_2/Nb_2O_5$ or the like, each layer can be 40 nm to 100 nm in thickness. The number of layers is two or more, for example, can be 5 to 20 layers. The total thickness of the second reflector 6 is, for example, 0.08 μm to 2.0 μm, and can be set as 0.6 pm to 1.7 μm.

Such a manufacturing method makes it possible to manufacture a higher external quantum efficiency vertical cavity surface emitting laser element in which dislocations in the semiconductor layers that make up the first reflector 10 are reduced and optical loss attributable to scattering by the first reflector 10 can be reduced, as described above.

Vertical Cavity Surface Emitting Laser Element 8

Figure 2:
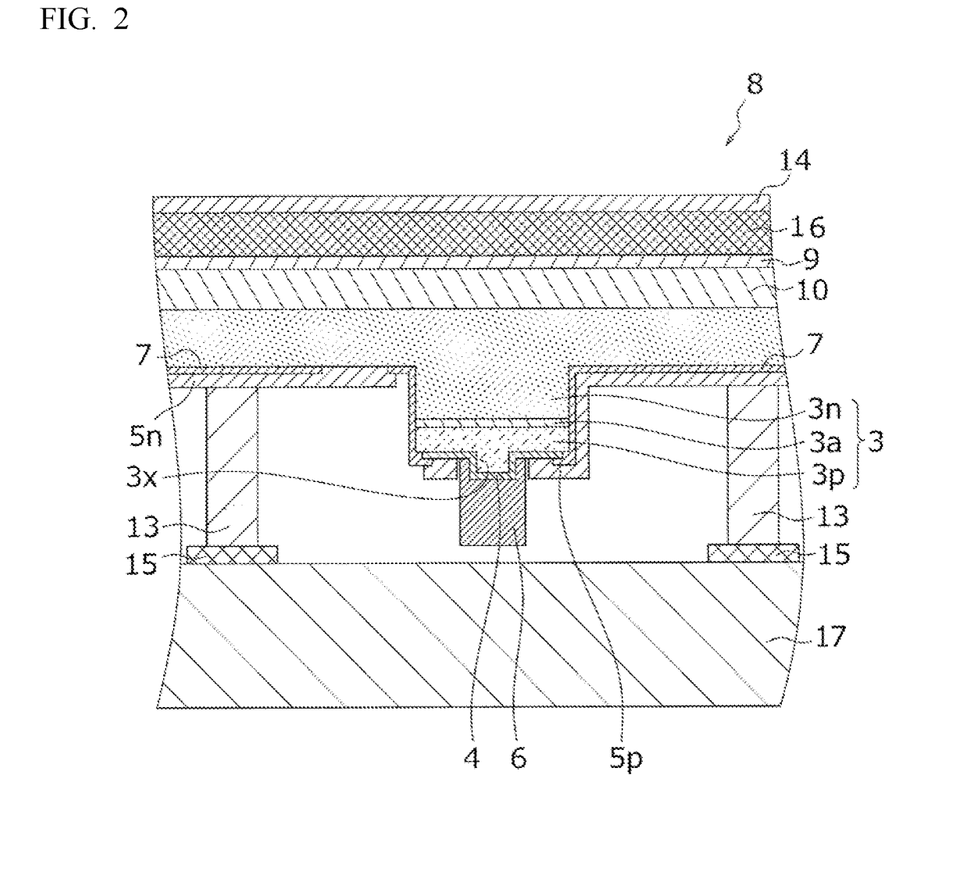
FIG. 2 is a schematic cross-sectional view explaining a vertical cavity surface emitting laser element according to an embodiment of the present invention.

A vertical cavity surface emitting laser element 8 according to an embodiment of the present disclosure comprises the first reflector 10 which includes a nitride semiconductor multilayer film in which first semiconductor layers 1 consisting of a group III nitride semiconductor containing aluminum and indium and second semiconductor layers consisting of gallium nitride are alternately stacked, and preferably, in addition to the first reflector 10, as shown in FIG. 2, the nitride semiconductor stack structure 3 and the second reflector 6.

The vertical cavity surface emitting laser element 8 can further include the substrate 16, the base layer 9, a p-side electrode 4, an n-side electrode 5n, and the insulation layer 7.

Furthermore, such a vertical cavity surface emitting laser element 8 is preferably bonded to a heat dissipating substrate 17 having a bonding layer 13 and a metal layer 15 so as to have the light emitting surface on the substrate 16 side. This structure may allow for a higher light output than having the light emitting surface on the second reflector 6 side.

Substrate 16 and Base Layer 9

The first reflector 10, as described above, is preferably formed on the substrate 16 via the base layer 9. Forming the first reflector 10 via the base layer 9 can facilitate the formation of a flatter layer. For the substrate 16, any substrate known in the art that can construct a vertical cavity surface emitting laser element can be used. Examples include a substrate for growing semiconductor layers, specifically a nitride semiconductor (GaN or the like), sapphire, SiC, Si, or the like. Among these, a nitride semiconductors is preferable and a GaN substrate is more preferable. The base layer 9 can be selected by considering lattice matching between such a substrate 16 and the first reflector 10, for example, a GaN layer is preferable. The surface of the base layer 9 is preferably the C-plane of GaN, more preferably the +C-plane thereof.

Nitride Semiconductor Stack Structure 3

The nitride semiconductor stack structure 3 is preferably disposed on the upper surface of the nitride semiconductor multilayer film which constitutes the first reflector 10. The nitride semiconductor stack structure 3 preferably has the active layer 3a. Specifically, as shown in FIG. 2, the nitride semiconductor stack structure 3 is preferably formed of the n-side semiconductor layer 3n consisting of a GaN-based semiconductor, the active layer 3a consisting of a GaN-based semiconductor, and the p-side semiconductor layer 3p consisting of a GaN-based semiconductor, for example, staked in this order from the first reflector 10 side. Examples of the GaN-based semiconductors include AlGaN, GaN, and InGaN.

The n-side semiconductor layer 3n is a single layer or multiple layers and has one or more n-type layers doped with an n-type impurity, for example, Si. The active layer 3a has a stacked structure in which quantum well layers of InGaN and barrier layers of GaN are alternately stacked, for example. The number of layers stacked can be suitably set in accordance with desired characteristics. The p-side semiconductor layer 3p can have a p-side contact layer. The p-side contact layer is a layer doped with a p-type impurity, for example, Mg. The p-side semiconductor layer 3p may have under the p-side contact layer a layer doped with a lower concentration p-type impurity than that of the p-side contact layer or an undoped layer. In this case, the p-side contact layer serves as the uppermost layer of the p-side semiconductor layer 3p.

The thicknesses of the n-side semiconductor layer 3n, the active layer 3a, and the p-side semiconductor layer 3p can be suitably set. The total thickness from the upper surface of the first reflector 10 to the lower surface of the second reflector 6 is set as an integral multiple of $\lambda/2n$ such that a standing wave occurs therebetween, in which the most intense portion and the least intense portion of the standing wave are respectively positioned in the active layer 3a and the light transmissive p-side electrode 4 described later.

The upper surface of the p-side semiconductor layer 3p can be in contact with the p-side electrode 4.

The nitride semiconductor stack structure 3 has the protruded part 3x on the upper surface of the p-side semiconductor layer 3p. The upper surface of the protruded part 3x functions as the current injection region. The portion immediately under the current injection region serves as the light emitting portion. The top plan view shape of the protruded part 3x can be circular, elliptical, polygonal, or the like, among which a circular shape is preferable. The size of the upper surface of the protruded part 3x, for example, is 3 μm to 12 μm in diameter or per side.

The nitride semiconductor stack structure 3 preferably exposes a portion of the n-side semiconductor layer 3n in the surface around the protruded part 3x, i.e., on the p-side semiconductor layer 3p side, achieved by removing a portion of the p-side semiconductor layer 3p, the active layer 3a, and the n-side semiconductor layer 3n in the thickness direction. This allows the p-side electrode 4 and the n-side electrode 5n for supplying an electric current to the laser element to be arranged on the same surface side of the stack structure 3.

P-side Electrode 4

The p-side electrode 4 is an electrode for injecting the electric current from the protruded part 3x of the p-side semiconductor layer 3p, and is in contact at least with the upper surface of the protruded part 3x. The p-side electrode 4 may extend to the lateral surfaces of the protruded part 3x or extend to the upper surface of the p-side semiconductor layer 3p around the protruded part 3x.

The p-side electrode 4 is a conductive member made of a material having light transmissivity with respect to the laser oscillation wavelength. Examples of light transmissive materials include transparent conductive materials using ITO (indium-tin oxide), IZO (indium-zinc oxide), or the like as a base material. A specific example is ITO. The smaller the thickness, the lower the light absorption by the p-side electrode 4 results, but the resistance increases. Accordingly, the thickness can be appropriately adjusted taking the balance between these into consideration. The thickness of the p-side electrode 4 can be, for example, 5 nm to 100 nm.

Insulation Layer 7

The insulation layer 7 is disposed distant from the upper surface of the protruded part 3x. The insulation layer 7 covers at least a portion of the surface of the p-side semiconductor layer 3p around the protruded part 3x. The insulation layer 7 may cover not only the p-side semiconductor layer 3p, but also the lateral surfaces of the active layer 3a and a portion of the upper surface of the exposed n-side semiconductor layer 3n. It may further cover the lateral surfaces of the stack structure 3.

The insulation layer 7 can be formed with an inorganic material, such as $SiO_2$-containing material, $Ta_2O_5$, $ZrO_2$, AlN, $Al_2O_3$, $Ga_2O_3$ or the like.

N-side Electrode 5n and P-pad Electrode 5p

The vertical cavity surface emitting laser element 8 is preferably further provided with the n-side electrode 5n electrically connected to the exposed n-side semiconductor layer 3n.

In addition to the light transmissive p-side electrode 4 formed on the p-side semiconductor layer 3p, a p-pad electrode 5p electrically connected to the p-side electrode 4 may be disposed.

The n-side electrode 5n and the p-pad electrode 5p can be formed with any conductive material normally used as electrodes in the art. Examples the material include Ti/Pt/Au, Ti/Rh/Au, and the like.

The n-side electrode 5n and the p-pad electrode 5p may have a single layer structure using the same or different materials, the same multilayer structure using the same materials, or different multilayer structures using different materials. In the case of forming the n-side electrode 5n and the p-pad electrode 5p as those having the same multilayer structure with the same materials, the n-side electrode 5n and the p-pad electrode 5p can be formed in the same process.

Heat Dissipating Substrate 17

The vertical cavity surface emitting laser element 8 may be bonded to the heat dissipating substrate 17 as shown in FIG. 2. For the heat dissipating substrate 17, a ceramic such as AlN, a semiconductor substrate containing a semiconductor such as SiC, a metal substrate made of a single metal, or a metal substrate which is a composite of two or more metals can be used. For example, a substrate having a metal film 15 formed at multiple locations on the surface of an insulating AlN ceramic used as a base material can be used as the heat dissipating substrate 17. The metal film 15 at multiple locations is respectively electrically connected to the p-pad electrode 5p and the n-side electrode 5n. The thickness of the heat dissipating substrate 17, for example, is 50 μm to 500 μm.

Any method normally used in the art can be utilized in forming the heat dissipating substrate 17.

For the bonding layer 13, in addition to similar materials to those for the p-pad electrode 5p and the n-side electrode 5n described above, solder or the like can be used.

The metal layer 15 can be formed with similar materials to those for the p-pad electrode 5p and the n-side electrode 5n described above.

Anti-Reflection Film 14

The vertical cavity surface emitting laser element 8 emits light from the first reflector 10 side, and may be provided with an anti-reflection film 14 on a surface of the first reflector 10 not facing the stack structure 3, i.e., the surface of the substrate 16 more distant from the stack structure 3. For the anti-reflection film 14, a similar material to any of the dielectric multilayer films described as examples for the second reflector 6 can be used. The film having a reflection preventing function can be formed by selecting a different number of layers and different layer thicknesses from those of a light reflecting film. Examples include $SiO_2/Nb_2O_5$, $SiO_2/Ta_2O_5$, $SiO_2/Al_2O_3$, and the like. The thickness is, for example, 0.1 μm to 1 μm.

Experimental Example 1

Using a GaN substrate as the substrate 16, a GaN layer was formed as the base layer 9 on the +C plane of the GaN substrate by MOCVD at a growth temperature of 1150° C. by using TMG and ammonia as source gases, and a carrier gas. On that, first semiconductor layers 1 were grown using TMA, TMI, and ammonia as source gases, and a carrier gas, under reduced pressure at the temperatures shown in Table 1 below. Each first semiconductor layer 1 was constituted of a first layer 11 and a second layer 12 which was grown at a higher growth rate than that for the first layer 11. On each first semiconductor layer 1, a second semiconductor layer 2 was grown by using TMG and ammonia as source gases, under reduced pressure and the temperature shown in Table 1. A first reflector 10 was formed to have fifty pairs of the first semiconductor layer 1 and the second semiconductor layer 2 and a total thickness of 4890 nm.

The first layer 11 of each first semiconductor layer 1 was grown under the conditions to have the composition: $Al_{0.83}In_{0.17}N$ (i.e., the aluminum composition ratio of 0.83 and the indium composition ratio of 0.17).

The second layer 12 of each first semiconductor layer 1 was grown under the conditions to have the composition: $Al_{0.80}In_{0.20}N$ (i.e., the aluminum composition ratio of 0.80 and the indium composition ratio of 0.20).

Each second semiconductor layer 2 was grown under the conditions to have the composition: GaN.

TABLE 1

| Layer | Composition | Thickness (nm) | Growth Temperature (° C.) |
|---|---|---|---|
| Second Semiconductor Layer 2 | GaN | 46.6 | 1050 |
| Second Layer 12 | $Al_{0.80}In_{0.20}N$ | 49.6 | 900 |
| First Layer 11 | $Al_{0.83}In_{0.17}N$ | 1.6 | 900 |

Figure 4:
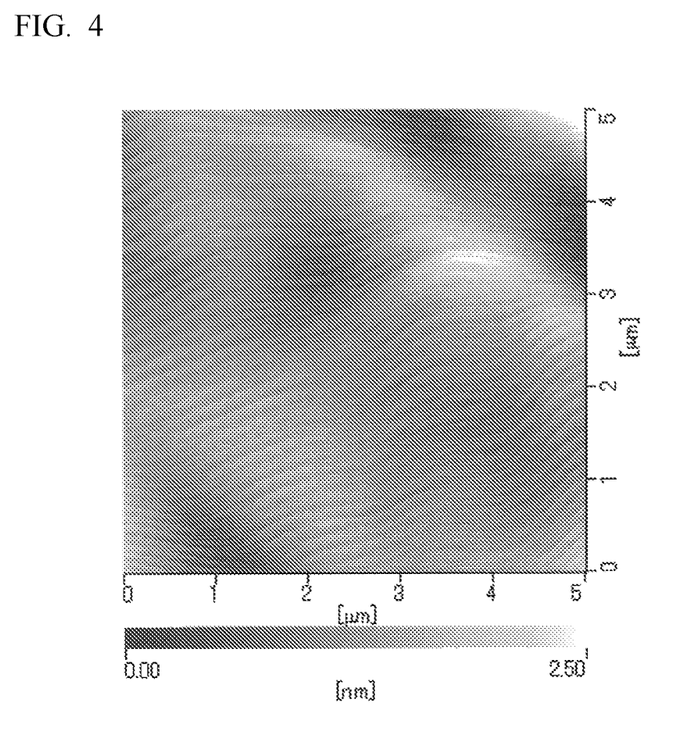
FIG. 4 is an AFM image of an experimental example.
Figure 5:
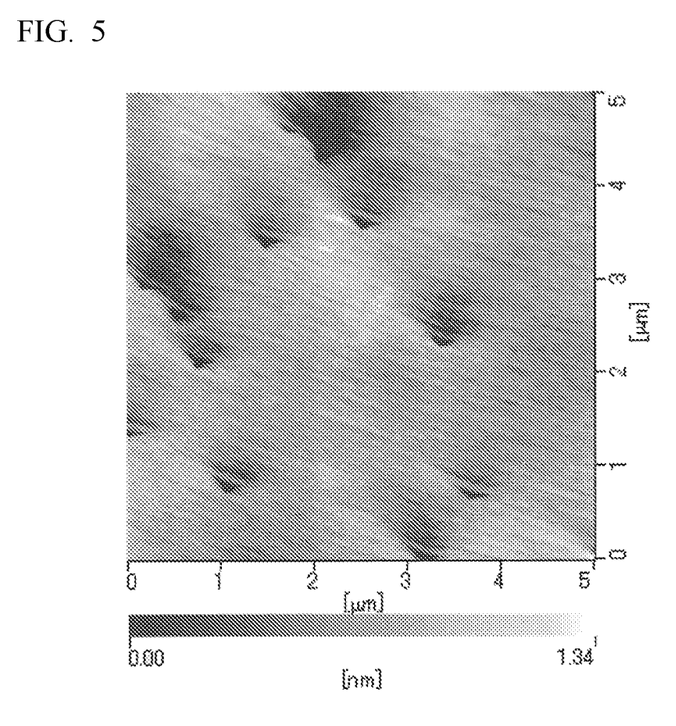
FIG. 5 is an AFM image of a comparative example.

Under substantially the same conditions as those for the first reflector 10 in the method described above except for not disposing any first layer 11, a reflector was formed as a comparative example by stacking the first semiconductor layers (the second layers 12) and the second semiconductor layers 2. FIG. 4 and FIG. 5 are images of the surfaces of the reflectors in the experimental example and the comparative example, respectively, observed as AFM (atomic force microscopy) images.

As shown in FIG. 4 and FIG. 5, in the regions observed, no V pits were found on the surface of the reflector in the experimental example, in contrast to the surface of the reflector in the comparative example on which several V pits were observed. These V pits are assumed to be attributed to defects such as dislocations. Thus, it can be concluded that the effect of reducing the dislocation can be confirmed in the experiment example.

Accordingly, it was confirmed that the method of manufacturing a vertical cavity surface emitting laser element in this experimental example reduces the occurrence of dislocations in the first reflector.

DENOTATION OF REFERENCE NUMERALS

1: first semiconductor layer; 11: first layer; 12: second layer; 2: second semiconductor layer; 3: stack structure; 3a: active layer; 3n: n-side semiconductor layer; 3p: p-side semiconductor layer; 3x: protruded part; 4: p-side electrode; 5n: n-side electrode; 5p: p-pad electrode; 6: second reflector; 7: insulation layer; 8: vertical cavity surface emitting laser element; 9: base layer; 10: first reflector; 13: bonding layer; 14: anti-reflection film; 15: metal layer; 16: substrate; and 17: heat dissipating substrate.

What is claimed is:

1. A method of manufacturing a vertical cavity surface emitting laser element including a first reflector including a nitride semiconductor multilayer film, the method comprising:
    growing a first semiconductor layer consisting of a group III semiconductor containing aluminum and indium, the growing of the first semiconductor layer consisting of
        growing a first layer by supplying an aluminum source gas, an indium source gas, and a nitrogen source gas, and
        growing a second layer by supplying an aluminum source gas, an indium source gas, and a nitrogen source gas so that an indium composition ratio of the second layer is higher than an indium composition ratio of the first layer; and
    growing a second semiconductor layer consisting of gallium nitride, wherein
    the growing of the first semiconductor layer and the growing of the second semiconductor are repeated alternately to form the nitride semiconductor multilayer film constituting the first reflector, and
    in each cycle of the growing of the first semiconductor layer the growing of the second layer is performed after the growing of the first layer.

2. The method of manufacturing a vertical cavity surface emitting laser element according to claim 1, wherein
    the growing of the first layer and the growing of the second layer are performed so that a growth rate for the second layer is higher than a growth rate for the first layer.

3. The method of manufacturing a vertical cavity surface emitting laser element according to claim 2, wherein
    the growth rate for the second layer is 1.5 times or greater and 4 times or less of the growth rate for the first layer.

4. The method of manufacturing a vertical cavity surface emitting laser element according to claim 1, wherein
    the growing of the first layer includes growing the first layer to have a thickness of 8 nm or less.

5. The method of manufacturing a vertical cavity surface emitting laser element according to claim 3, wherein
    the growing of the first layer includes growing the first layer to have a thickness of 8 nm or less.

6. The method of manufacturing a vertical cavity surface emitting laser element according to claim 1, wherein
    the growing of the first layer and the growing of the second layer are performed so that a thickness of the second layer is larger than a thickness of the first layer.

7. The method of manufacturing a vertical cavity surface emitting laser element according to claim 5, wherein
    the growing of the first layer and the growing of the second layer are performed so that a thickness of the second layer is larger than a thickness of the first layer.

8. The method of manufacturing a vertical cavity surface emitting laser according to claim 1, further comprising:
    forming, on an upper surface of the first reflector, a nitride semiconductor stack structure including an active layer; and
    forming a second reflector above the nitride semiconductor stack structure.

9. The method of manufacturing a vertical cavity surface emitting laser according to claim 6, further comprising:
    forming, on an upper surface of the first reflector, a nitride semiconductor stack structure including an active layer; and
    forming a second reflector above the nitride semiconductor stack structure.

10. The method of manufacturing a vertical cavity surface emitting laser according to claim 7, further comprising:
    forming, on an upper surface of the first reflector, a nitride semiconductor stack structure including an active layer; and
    forming a second reflector above the nitride semiconductor stack structure.

11. A vertical cavity surface emitting laser element comprising:
    a substrate; and
    a first reflector including a nitride semiconductor multilayer film disposed above the substrate, the nitride semiconductor multilayer film including
        a plurality of first semiconductor layers each consisting of a group III nitride semiconductor containing aluminum and indium, and
        a plurality of second semiconductor layers each consisting of gallium nitride,
        the first semiconductor layers and the second semiconductor layers being alternately stacked, wherein
    a refractive index of the first semiconductor layers is different from a refractive index of the second semiconductor layers, and
    each of the first semiconductor layers consists of a first layer and a second layer, an indium composition ratio of the first layer being higher than an indium composition ratio of the second layer, in each of the first semiconductor layers, the first layer is disposed closer to the substrate than the second layer.

12. The vertical cavity surface emitting laser element according to claim 11, wherein
    a thickness of the first layer in each of the first semiconductor layers is 8 nm or less.

13. The vertical cavity surface emitting laser element according to claim 11, wherein a thickness of the first layer in each of the first semiconductor layers is 8 nm or less.

14. The vertical cavity surface emitting laser element according to claim 11, wherein
the indium composition ratio of the first layer is lower than the indium composition ratio of the second layer by 0.01 or greater and 0.1 or less.

15. The vertical cavity surface emitting laser element according to claim 13, wherein
the indium composition ratio of the first layers is lower than the indium composition ratio of the second layers by 0.01 or greater and 0.1 or less.

16. The vertical cavity surface emitting laser element according to claim 11, further comprising:
a nitride semiconductor stack structure disposed on an upper surface of the nitride semiconductor multilayer film, and including an active layer; and
a second reflector disposed above the nitride semiconductor stack structure.

17. The vertical cavity surface emitting laser element according to claim 15, further comprising:
a nitride semiconductor stack structure disposed on an upper surface of the nitride semiconductor multilayer film, and including an active layer; and
a second reflector disposed above the nitride semiconductor stack structure.

18. The vertical cavity surface emitting laser element according to claim 11, wherein
the first semiconductor layers are AlInN layers, and the indium composition ratio of the second layer is 0.15 or greater and 0.25 or less.

19. The vertical cavity surface emitting laser element according to claim 17, wherein
the first semiconductor layers are AlInN layers, and the indium composition ratio of the second layer is 0.15 or greater and 0.25 or less.

20. The vertical cavity surface emitting laser element according to claim 11, wherein
in each of the first semiconductor layers, a thickness of the second layer is larger than a thickness of the first layer.

* * * * *